Figure 1:
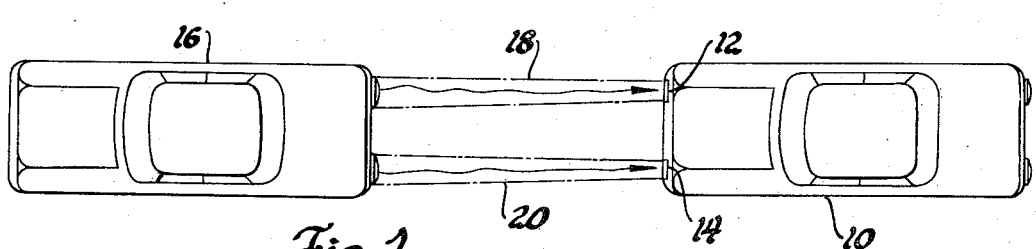

United States Patent [19]

McIntosh

[11] 3,793,621
[45] Feb. 19, 1974

[54] AUTOMATIC VEHICLE BRAKE AND DIRECTIONAL LIGHTS INITIATOR
[75] Inventor: Duane E. McIntosh, Palmyra, Wis.
[73] Assignee: General Motors Corporation, Detroit, Mich.
[22] Filed: Nov. 24, 1972
[21] Appl. No.: 309,222

[52] U.S. Cl.................. 340/53, 340/34, 315/134
[51] Int. Cl............................................. B60q 1/44
[58] Field of Search........... 340/31, 33, 34, 53, 104; 315/79, 80, 133, 134

[56] References Cited
UNITED STATES PATENTS
| 2,974,304 | 3/1961 | Nordlund | 340/33 |
| 3,210,726 | 10/1965 | Copsy | 340/33 |
| 3,192,437 | 6/1965 | Meyer | 340/34 X |
| 3,491,334 | 1/1970 | Martin | 340/34 |
| 3,251,997 | 5/1966 | Bell et al | 315/134 X |

Primary Examiner—Alvin H. Waring
Attorney, Agent, or Firm—Howard N. Conkey

[57] ABSTRACT

A vehicle brake and directional lights initiator including two groups of sensors for viewing the left and right sides, respectively, of a preceding vehicle. Means are described for determining whether all of the red light sensed is a component of white light or whether at least a portion of the red light sensed is the output of the rear lights of the preceding vehicle. When at least a portion of the red light sensed is the result of red light radiating from the rear of the preceding vehicle, a circuit is responsive thereto for energizing the brake and directional lights in response to like energization by the operator of the preceding vehicle and for energizing the brake lights when the rate of closure between the vehicles exceeds a predetermined value.

3 Claims, 2 Drawing Figures

PATENTED FEB 19 1974 3,793,621

AUTOMATIC VEHICLE BRAKE AND DIRECTIONAL LIGHTS INITIATOR

This invention relates to a vehicle brake and directional lights initiator for energizing the vehicle brake and directional lights in response to corresponding energization of the brake and directional lights by the operator of a preceding vehicle and for energizing the brake lights when the rate of closure between the vehicles exceeds a predetermined value.

When the brake or directional lights of a first vehicle preceding a second vehicle are energized, it is desirable to relay this information to a third vehicle following the second vehicle in as short a time as possible to provide the operator of the third vehicle maximum time to react to the information provided. It is the general object of this invention to provide an automatic vehicle brake and directional lights initiator for energizing the vehicle brake and directional lights in response to the energization of the respective brake or directional lights of a preceding vehicle.

It is another object of this invention to provide a brake and directional lights initiator installed in a vehicle for monitoring the red light radiating from the rear of a preceding vehicle and initiating the energization of the brake or directional lights of the vehicle in which the initiator is installed in response to the energization of the respective brake or directional lights of the preceding vehicle, the initiator being insensitive to the red component of white light.

It is another object of this invention to provide a brake and directional lights initiator installed on a vehicle for monitoring the red light radiating from the rear of a preceding vehicle and initiating the energization of the brake or directional lights of the vehicle in which the initiator is installed in response to the energization of the respective brake or directional lights of the preceding vehicle and for energizing the brake lights of the vehicle upon which the initiator is installed in response to a rate of closure between said vehicle and the preceding vehicle which exceeds a predetermined rate, the initiator being insensitive to the red component of the white light.

Figure 2:
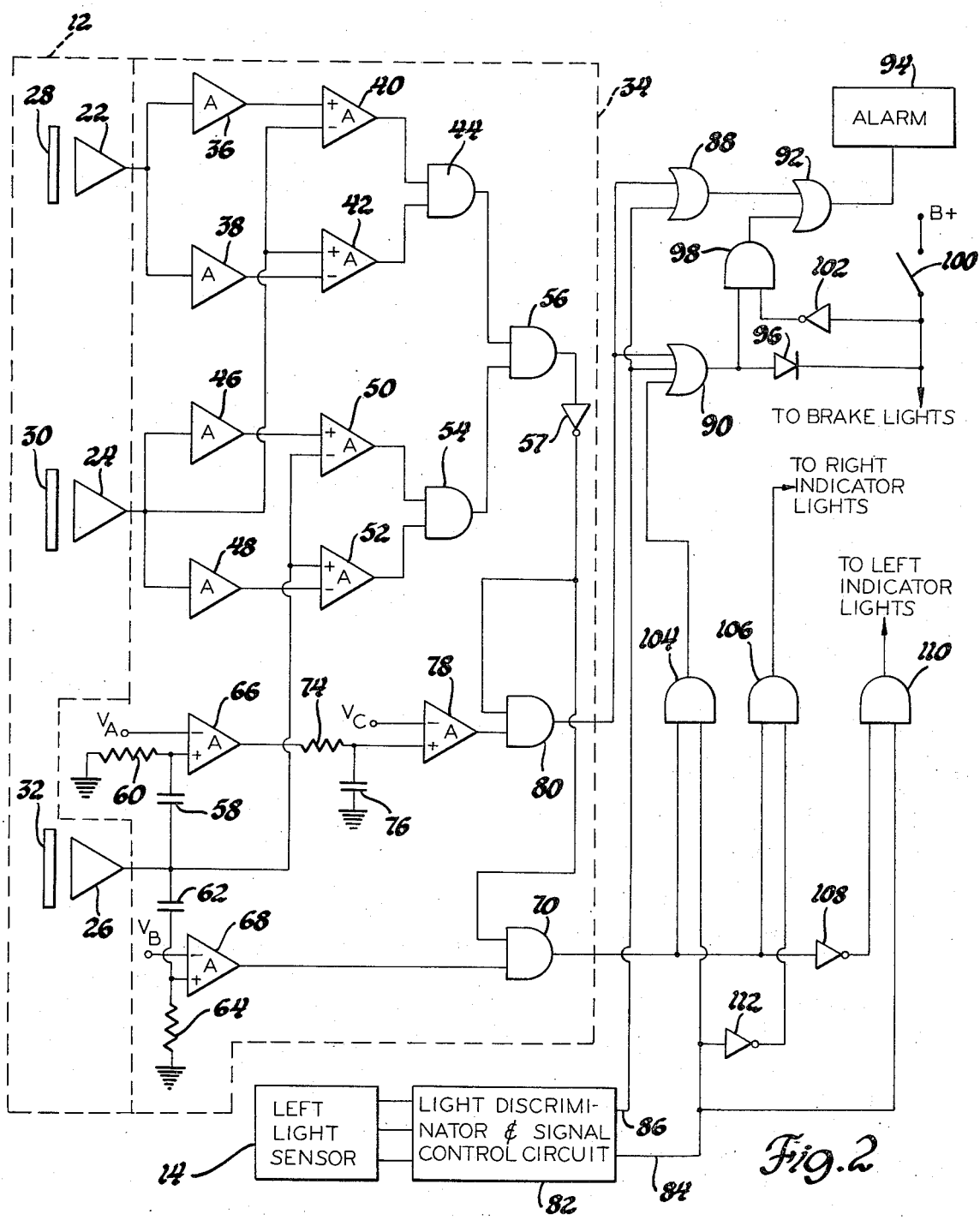

These and other objects of this invention may be better understood by reference to the following description of a preferred embodiment of the invention and the drawings in which:

FIG. 1 is a schematic view of a pair of vehicles traveling in a normal traffic configuration with the trailing vehicle incorporating the initiator of this invention; and FIG. 2 is a schematic drawing of the preferred embodiment of the brake and directional lights initiator of this invention.

Referring to FIG. 1, a vehicle 10 includes a light sensor 12 and a light sensor 14 for monitoring the light radiating from the rear of a preceding vehicle 16. The light sensors 12 and 14 are roughly collimated and have respective sensing corridors 18 and 20 which intersect the ground at a predetermined distance in front of the vehicle 10 so as to limit the operating distance of the initiator to be described. The light sensors 12 and 14 are also oriented so as to view the respective right and left side of the rear of the vehicle 16, the light sensor 12 not being able to sense the light output from tne left side of the vehicle 10 and conversely, the light sensor 14 being unable to sense light output from the right side of the rear of the vehicle 16. A circuit to be described is carried by the vehicle 10 for initiating the energization of its brake and directional lights in response to the energization of the respective brake and directional lights of the vehicle 16 and to energize the brake lights when the rate of closure between the vehicles 10 and 16 exceeds a predetermined magnitude.

Referring to FIGS. 1 and 2, the light sensor 12 consists of three photosensitive devices 22, 24 and 26, a yellow filter 28, a blue filter 30 and a red filter 32. The yellow filter 28 is positioned relative to the photosensitive device 28 such that only the yellow component of light impinging on the light sensor 12 is sensed by the photosensitive device 28. Similarly, the blue and red filters 30 and 32 are positioned relative to the photosensitive devices 24 and 26, respectively, such that only the blue and red components of the light impinging on the light sensor 12 are sensed by the respective photosensitive devices 24 and 26.

White light from various man-made sources contains approximately equal amounts of the colors blue, yellow and red, hereinafter referred as the primary colors. Since light from these sources, such as street lights and oncoming vehicle headlights, will from time to time exist in the sensing corridor 18 of the light sensor 12, illumination of the light sensor 12 from those sources must not cause the initiation of the brake and directional light of the vehicle 10 upon which the light sensors 12 and 14 are mounted. The right light sensor 12 includes the three filters 28, 30 and 32 and the plurality of photosensitive devices 22, 24 and 26 so as to provide a means of identifying white light, which is rich in red, and to use this information to prevent the brake and directional lights of the vehicle 10 from being initiated when the net light sensed by the light sensor 12 is white light.

A light discriminator and signal control circuit 34 is provided for monitoring the outputs of the photosensitive devices 22, 24 and 26 and for generating an output signal when the net light impinging on the light sensor 12 is white light. The circuit 34 accomplishes this function by determining whether the percentages of each of the primary colors contained in the net light impinging on the light sensor 12 are substantially equal.

The output of the photosensitive device 22, which monitors the yellow component of the light impinging on the light sensor 12, is coupled to the input of an amplifier 36 having a gain greater than unity, which gain may be, for example, 1.2, and to the input of an amplifier 38 which has a gain less than unity, which gain may be, for example, 0.8. The outputs of the amplifiers 36 and 38 represent a tolerance band around the magnitude of yellow light sensed by the photosensitve device 22. The output of the photosensitive device 24, representing the blue light component of the light impinging on the light sensor 12, is compared with the outputs of the amplifiers 36 and 38 to determine whether the yellow and blue components of the light impinging on the light sensor 12 are approximately equal. This is accomplished by a pair of differential amplifiers 40 and 42. The output of the amplifier 36 is supplied to the positive input of the differential amplifier 40 and the output of the amplifier 38 is supplied to the negative input of the differential amplifier 42. The output of the photosensitive device 24 is coupled to the negative input of the differential amplifier 40 and to the positive input of the differential amplifier 42. When the blue component of light impinging on the light sensor 12 is substantially equal to the yellow component thereof, i.e., within the tolerance band generated by the amplifiers 36 and 38, both of the outputs of the differential amplifiers 40 and 42 are positive voltages. When the blue component is less than or greater than the tolerance band, the outputs of the differential amplifiers 42 and 40, respectively, are negative. The outputs of the differential amplifiers 40 and 42 are coupled to respective inputs of an AND gate 44 which generates a positive voltage at its output when the blue and yellow components of light impinging on the light sensor 12 are substantially equal.

The output of the photosensitive device 24 is coupled to the input of an amplifier 46 having a gain greater than unity, for example, 1.2, and to the input of an amplifier 48 having a gain less than unity, for example, 0.8. The outputs of the amplifiers 46 and 48 represent a tolerance band around the magnitude of blue light sensed by the photosensitive device 24. The output of the photosensitive device 26 representing the red component of the light impinging on the photosensitive device 26 is compared with the outputs of the amplifiers 46 and 48 to determine whether the blue and red components of the light impinging on the light sensor 12 are approximately equal. This is accomplished by a pair of differential amplifiers 50 and 52. The output of the amplifier 46 is coupled to the positive input of the differential amplifier 50 and the output of the amplifier 48 is coupled to the negative input of the differential amplifier 52. The output of the photosensitive device 26 is coupled to the negative input of the differential amplifier 50 and to the positive input of the differential amplifier 52. When the red component of light impinging on the light sensor 12 is substantially equal to the blue component thereof, i.e., within the tolerance band generated by the amplifiers 46 and 48, the outputs of both of the differential amplifiers 50 and 52 are positive potentials. When the red component of the light impinging on the light sensor 12 is outside the tolerance band, i.e., less than the gain of the amplifier 48 times the blue component of the light impinging on the light sensor 12 or greater than the gain of the amplifier 46 times the blue component, the respective differential amplifier 52 or 50 generates a negative potential at its output. The outputs of the differential amplifiers 50 and 52 are coupled to respective inputs of an AND gate 54 which is responsive thereto for generating a positive potential when both of the outputs of the differential amplifiers 50 and 52 are positive voltages.

The outputs of the AND gates 44 and 54 are coupled to respective inputs of an AND gate 56. When the yellow, blue and red componets of light impinging on the light sensor 12 are substantially equal, both of the AND gates 44 and 54 are enabled to supply a positive voltage to the respective inputs of the AND gate 56 which in turn is enabled to supply a positive voltage signal at its output. This positive voltage represents the fact that the net light impinging on the light sensor 12 is white light. An inverter 57 inverts this voltage signal to supply a ground signal when the net light impinging on the light sensor 12 is white light.

When a portion of the net light impinging on the light sensor 12 is from the right rear lights of preceding vehicle 16, the red component of the net light sensed will be substantially larger than the yellow and blue components sensed. Consequently, the output of the differential amplifier 50 is a negative signal which inhibits the AND gate 54 and consequently the AND gate 56 which supplies a ground signal at its output. This output is inverted by the inverter 57 whose positive output represents that at least a portion of the red light sensed by the light sensor 12 is from the right rear of a preceding vehicle.

The output of the photosensitive device 26 representing the red component of the light impinging on the light sensor 12 is coupled to ground through a capacitor 58 and a resistor 60 and to ground through a capacitor 62 and a resistor 64. The junction between the capacitor 58 and the resistor 60 is coupled to the positive input of a differential amplifier 66 which receives a reference voltage $V_A$ at the negative input thereof. The junction between the capacitor 62 and the resistor 64 is coupled to the positive input of a differential amplifier 68 which receives a reference voltage $V_B$ at its negative input.

The differential amplifier 68, the capacitor 62 and the resistor 64 function as a rate circuit which generates a positive output voltage when the rate increase of the red component of light impinging on the light sensor 12 as sensed by the photosensitive device 26 reaches a predetermined value. The values of the capacitor 62 and the resistor 64 are such that a near step function increase in the red component is required to produce a voltage at the positive input of the differential amplifier 68 which exceeds the reference voltage $V_B$. When this condition occurs, the output of the differential amplifier 68 shifts to a positive level to indicate that a near step function has occurred in the red component of light impinging on the light sensor 12. This condition will occur when the right brake or directional lights of the preceding vehicle 16 of FIG. 1 are energized or when light from a white light source suddenly intersects the sensing corridor 18. The output of the differential amplifier 68 is a voltage pulse coupled to an input of an AND gate 70 which receives at a second input thereof, the output of the inverter 72. The output of the inverter 57 is at ground potential when the net light impinging on the light sensor 12 is white light as previously described. Therefore, if a positive voltage is supplied at the output of the differential amplifier 68 as a result of a near step input of the red component of white light, the AND gate 70 is inhibited by the output of the inverter 57 from generating an output signal. Conversely, when a near step input of red light is sensed which is not a component of white light, the outputs of the inverter 57 and the differential amplifier 68 enable the AND gate 70 to generate a positive voltage pulse indicating the energization of the right brake or directional signal light of the preceding vehicle 16.

The differential amplifier 66, the capacitor 58 and the resistor 60 function as a second rate circuit which generates a positive output voltage when the rate of increase of the red component of light impinging on the light sensor 12 as sensed by the photosensitive device 26 reaches a predetermined value. The values of the capacitor 58 and the resistor 60 are such that a predetermined rate increase in the red component less than a near step input is required to produce a voltage at the positive input of the differential amplifier 66 which exceeds the reference voltage $V_A$. This predetermined rate increase in the red light sensed represents a closing rate between the vehicle 10 and the red light source such as would be caused by a potentially hazardous closing rate between the vehicle 16 and the vehicle 10 of FIG. 1 as determined from the red light output of the right tail lights of the vehicle 16. The output of the differential amplifier 66 is coupled to ground through a resistor 74 and a capacitor 76, the junction between the resistor 74 and the capacitor 76 being coupled to the positive input of a differential amplifier 78. The differential amplifer 78 has a reference voltage $V_C$ supplied to the negative input thereof. The resistor 74 and the capacitor 76 have a time constant such that the positive input to the differential amplifier 78 exceeds the value $V_C$ a predetermined time period after the output of the differential amplifier 66 goes positive. This time delay is sufficient to prevent the differential amplifier 78 from generating an output signal when a near step input of red light is sensed by the photosensitive device 26. The output of the differential amplifier 78 is coupled to one input of an AND gate 80 which receives at a second input the output of the inverter 57. When the rate of increase of the red light component of light impinging on the light sensor 12 exceeds the predetermined value, the output of the differential amplifier 66 shifts to a positive voltage level as previously described. If this rate of increase exists for the time period determined by the capacitor 76 and the resistor 74, the output of the differential amplifier 78 shifts to a positive voltage. If the net light sensed by the light sensor 12 is white light, the AND gate is inhibited by the output of the inverter 57. If the net light sensed is not white light and the rate increase of red light represents a potentially hazardous closing rate, the AND gate 80 is enabled to supply a positive voltage signal representing the potentially hazardous rate of closure between the preceding vehicle 16 and the vehicle 12 of FIG. 1 for the time duration of such rate of closure.

The light sensor 14 of FIG. 1 is identical to the light sensor 12 previously described. The outputs of the light sensor 14 are coupled to a light discriminator and signal control circuit 82 identical to the light discriminator and signal control circuit 34. When the light sensor 14 and the circuit 82 detect a step input representing the energization of the left brake or directional lights of the preceding vehicle 16, a positive voltage pulse is supplied on the line 84. When the light sensor 14 and the circuit 82 detect a potentially hazardous rate of closure between the preceding vehicle 16 and the vehicle 12, a positive voltage is supplied on the line 86 for the time duration that such rate of closure exists.

The output of the AND gate 80 and the line 86 are coupled to respective inputs of an OR gate 88 and to respective inputs of an OR gate 90. The output of the OR gate 88 is coupled to an input of an OR gate 92 whose output is coupled to an alarm 94. The output of the OR gate 90 is coupled to the brake lights of the vehicle 10 through a blocking diode 96 and to an input of an AND gate 98. A conventional brake switch 100 responsive to the actuation of the vehicle 10 brake pedal is provided between a source of power B+ which may be, for example, the vehicle battery, and the brake lights for energizing the brake lights in the conventional manner. In addition, the source of power B+ is coupled to the input of an inverter 102 through the brake switch 100, the output of the inverter 102 being coupled to a second input of the AND gate 98. The output of the AND gate 98 is coupled to a second input of the OR gate 92.

When the rate of closure between the preceding vehicle 16 and the vehicle 12 of FIG. 1 exceeds the predetermined rate as determined by the rate of increase of the red light component from the light output of the tail lights of the preceding vehicle 16, the positive voltage supplied at the output of the AND gate 80 or the positve voltage supplied on the line 86 enables the OR gates 88 and 90 to supply positive voltages respectively to the OR gate 92, the AND gate 98 and the brake lights through the diode 96. The positive voltage supplied to the OR gate 92 enables the OR gate 92 to energize the alarm 94 to provide an indication to the operator of the vehicle 10 of the potentially hazardous closing rate between the preceding vehicle 16 and the vehicle 10. The positive voltage supplied through the diode 96 energizes the brake lights to provide an indication to vehicles following the vehicle 10 of the potentially hazardous condition. The brake lights are energized and the alarm is given as long as this rate of closure exists.

The output of the AND gate 70 is coupled to an input of an AND gate 104, to an input of an AND gate 106 and to the input of an inverter 108. The output of the inverter 108 is coupled to an input of an AND gate 110. The line 84 from the light discriminator and signal control circuit 82 is coupled to a second input of the AND gate 104, to a second input of the AND gate 110 and to the input of an inverter 112. The output of the inverter 112 is coupled to a second input of the AND gate 106. The output of the AND gate 106 is coupled to the right directional lamps of the vehicle 10 and the output of the AND gate 110 is coupled to the left directional lamps of the vehicle 10.

When the right turn signal lights on the preceding vehicle 16 are flashed, a positive voltage pulse is supplied by the AND gate 70 each time the right signal lights are energized and the output of the light discriminator and signal control circuit is a continuous ground signal. As the output of the inverter 112 is then a positive voltage, the AND gate 106 is enabled by each positive pulse input from the AND gate 70 to flash the right directional lights of the vehicle 10. The AND gates 104 and 110 are inhibited by the ground signal input through the line 84.

When the left turn signal lights on the preceding vehicle 16 are flashed, a positive voltage pulse is supplied by the light discriminator and signal control circuit 82 through the line 84 each time the left signal lights are energized and the output of the AND gate 70 is a continuous ground signal. As the output of the inverter 108 is then a positive voltage, the AND gate 110 is enabled by each positive pulse input through the line 84 to flash the left directional lights of the vehicle 10. The AND gates 104 and 106 are inhibited by the ground signal input from the AND gate 70.

If the brake lights of the preceding vehicle are energized, both of the light discriminator and signal control circuits 34 and 82 detect the resulting near step increase in the red component of light and supply a positive voltage pulse at the output of the AND gate 70 and on the line 84 respectively. As both inputs to the AND gate 104 are then positive voltages, the output thereof shifts to a positive voltage which is supplied to the OR gate 90. The OR gate 90 is enabled thereby to supply a positive voltage to the AND gate 98 and through the diode 96 to energize the brake lights of the vehicle 10 for the duration of the voltage pulses at the output of the AND gate 80 and on the line 84. In this manner the brake lights of the vehicle 10 are initiated, it being necessary for the operator of the vehicle 10 to actuate the brakes to maintain the brake lights energized. If at that time the vehicle brake switch 100 is open, the output of the inverter 102 is a positive voltage which enables the AND gate 98 to supply a positive voltage to the OR gate 92 which is responsive thereto for energizing the alarm 94 to provide an indication of the actuation of the brakes of the preceding vehicle. If the brakes of the vehicle 10 are actuated and the brake switch 100 is closed, the output of the inverter 102 is a ground signal which inhibits the AND gate to prevent the alarm 94 from being energized.

It will be apparent to one skilled in the art that the outputs of the brake switch 100, the AND gate 106 and the AND gate 110 could be coupled to the directional signal mechanism where certain switching functions could be performed, such as rendering the outputs of the AND gates 106 and 110 ineffective when the directional signal mechanism is operated to indicate a turn and for permitting the use of single lamp filaments for both brake and directional indications.

The detailed description of the preferred embodiment of the invention for the purpose of explaining the principles thereof is not to be considered as limiting or restricting the invention, since many modifications may be made by the exercise of skill in the art without departing from the scope of the invention.

What is claimed is:

1. An apparatus for automatically energizing the brake and directional lights of a vehicle comprising: first and second light sensing means mounted on the vehicle for viewing the light output from the right and left rear, respectively, of a preceding vehicle, each of the light sensing means including first signal generating means for generating a first signal having a magnitude related to the red color component of light impinging on the respective light sensing means, second signal generating means for generating a second signal having a magnitude related to at least one other color component of light impinging on the respective light sensing means, said other color being a color component of white light and having a known relationship to the red color component of white light, and means coupled to the first and second signal generating means for generating a control signal when the red color component of light sensed and the other color component of light sensed as represented by the first and second signals have a relationship different from the known relationship; first gate means responsive to the control signals for energizing the right directional lights of the vehicle when only the control signal associated with the first light sensing means is being generated; second gate means responsive to the control signals for energizing the left directional lights of the vehicle when only the control signal associated with the second light sensing means is being generated; and third gate means responsive to the control signals for energizing the brake lights of the vehicle while both of the control signals are being simultaneously generated, the brake and directional lights of the vehicle being energized in response to like energization of the brake and directional lights of the preceding vehicle.

2. An apparatus for automatically energizing the brake and directional lights of a vehicle comprising: first and second light sensing means mounted on the vehicle for viewing the light output from the right and left rear, respectively, of a preceding vehicle, each of the light sensing means including first signal generating means for generating a first signal having a magnitude related to the red color component of light impinging on the respective light sensing means, second signal generating means for generating a second signal having a magnitude related to at least one other color component of light impinging on the respective light sensing means, said other color being a color component of white light and having a known relationship to the red color component of white light, means coupled to the first and second signal generating means for generating a first enabling signal when the red color component of light sensed and the other color component of light sensed as represented by the first and second signals have a relationship different from the known relationship, a rate circuit responsive to a step increase in the first signal for generating a second enabling signal, and first gate means responsive to the simultaneous generation of the first and second enabling signals for generating a control signal; second gate means responsive to the control signals for energizing the right directional lights of the vehicle when only the control signal associated with the first light sensing means is generated; third gate means responsive to the control signals for energizing the left directional lights of the vehicle when only the control signal associated with the second light sensing means is being generated; and fourth gate means responsive to the control signals for energizing the brake lights of the vehicle while both of the control signals are being simultaneously generated, the brake and directional lights of the vehicle being energized in response to like energization of the brake and directional light of the preceding vehicle.

3. An apparatus for automatically energizing the brake and directional lights of a vehicle comprising: first and second light sensing means mounted on the vehicle for viewing the light output from the right and left rear, respectively, of a preceding vehicle, each of the light sensing means including first signal generating means for generating a first signal having a magnitude related to the red color component of light impinging on the respective light sensing means, second signal generating means for generating a second signal having a magnitude related to at least one other color component of light impinging on the respective light sensing means, said other color being a color component of white light and having a known relationship to the red color component of white light, means coupled to the first and second signal generating means for generating a first enabling signal when the red color component of light sensed and the other color component of light sensed as represented by the first and second signals have a relationship different from the known relationship, a first rate circuit responsive to a step increase in the first signal for generating a second enabling signal, a second rate circuit responsive to a rate increase in the first signal representing a predetermined closure rate between the vehicle and the preceding vehicle for generating a third enabling signal, first gate means responsive to the simultaneous generation of the first and second enabling signals for generating a first control signal, and second gate means responsive to the simultaneous generation of the first and third enabling signals for generating a second control signal; third gate means responsive to the first control signals for energizing the right directional lights of the vehicle when only the first control signal associated with the first light sensing means is generated; fourth gate means responsive to the first control signals for energizing the left directional lights of the vehicle when only the first control signal associated with the second light sensing means is being generated; fifth gate means responsive to the first control signals for energizing the brake lights of the vehicle while both of the first control signals are being simultaneously generated; and sixth gate means responsive to the second control signals for energizing the brake lights of the vehicle when one or both of the second control signals is being generated, the brake and directional lights of the vehicle being energized in response to like energization of the brake and directional light of the preceding vehicle and the brake lights of the vehicle being energized when the closure rate between the vehicle and the preceding vehicle is at the predetermined rate.

* * * * *